(12) United States Patent
Siechen et al.

(10) Patent No.: US 9,203,188 B1
(45) Date of Patent: Dec. 1, 2015

(54) SINGLE-MOTION TRIGGER EJECTOR WITH OPTICAL SWITCH ACTUATOR

(71) Applicant: Cisco Technology, Inc., San Jose, CA (US)

(72) Inventors: Mark Siechen, Scotts Valley, CA (US); Lin Shen, Saratoga, CA (US); Randy Bleske, San Jose, CA (US); Stephen Ong, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 14/449,041

(22) Filed: Jul. 31, 2014

Related U.S. Application Data

(60) Provisional application No. 61/900,991, filed on Nov. 6, 2013.

(51) Int. Cl.
*H05K 5/00* (2006.01)
*H01R 13/629* (2006.01)

(52) U.S. Cl.
CPC ............................ *H01R 13/62994* (2013.01)

(58) Field of Classification Search
USPC ............... 361/727, 756, 679.04, 679.38, 801, 361/802; 385/135; 439/76.1, 534
See application file for complete search history.

(56) References Cited

U.S. PATENT DOCUMENTS

| | | | | |
|---|---|---|---|---|
| 6,266,248 | B1 * | 7/2001 | Hanas et al. | 361/752 |
| 6,515,866 | B2 * | 2/2003 | Ulrich | 361/759 |
| 6,634,898 | B2 * | 10/2003 | Clements | 439/327 |
| 6,898,088 | B2 * | 5/2005 | Megason et al. | 361/832 |
| 6,961,249 | B2 * | 11/2005 | Wong | 361/801 |
| 7,301,778 | B1 * | 11/2007 | Fang | 361/759 |
| 7,684,209 | B2 * | 3/2010 | Roesner | 361/798 |
| 8,953,332 | B2 * | 2/2015 | Canfield et al. | 361/759 |

* cited by examiner

*Primary Examiner* — Hung S Bui
(74) *Attorney, Agent, or Firm* — Novak Druce Connolly Bove + Quigg LLP

(57) ABSTRACT

A single-motion trigger line card insertion/removal tool uses a handle and a spring-loaded sliding trigger to allow a technician to grab the line card insertion/removal tool with their thumb and pointer fingers, and pull the trigger while rotating the handle to eject the line card from a network device. The motion of pulling the trigger simultaneously unlocks the line card insertion/removal tool, starts the rotation of the handle with the spring load, and closes a "window" on an optical switch breaking a continuous beam of light that software interprets as a warning that the line card will be removed momentarily. When the line card insertion/removal tool handle is rotated back to a closed position (i.e. while inserting the card), the spring tension pulls the trigger back to its original position, locking the line card insertion/removal tool handle, and opening the window for to the beam of light in the optical switch.

14 Claims, 10 Drawing Sheets

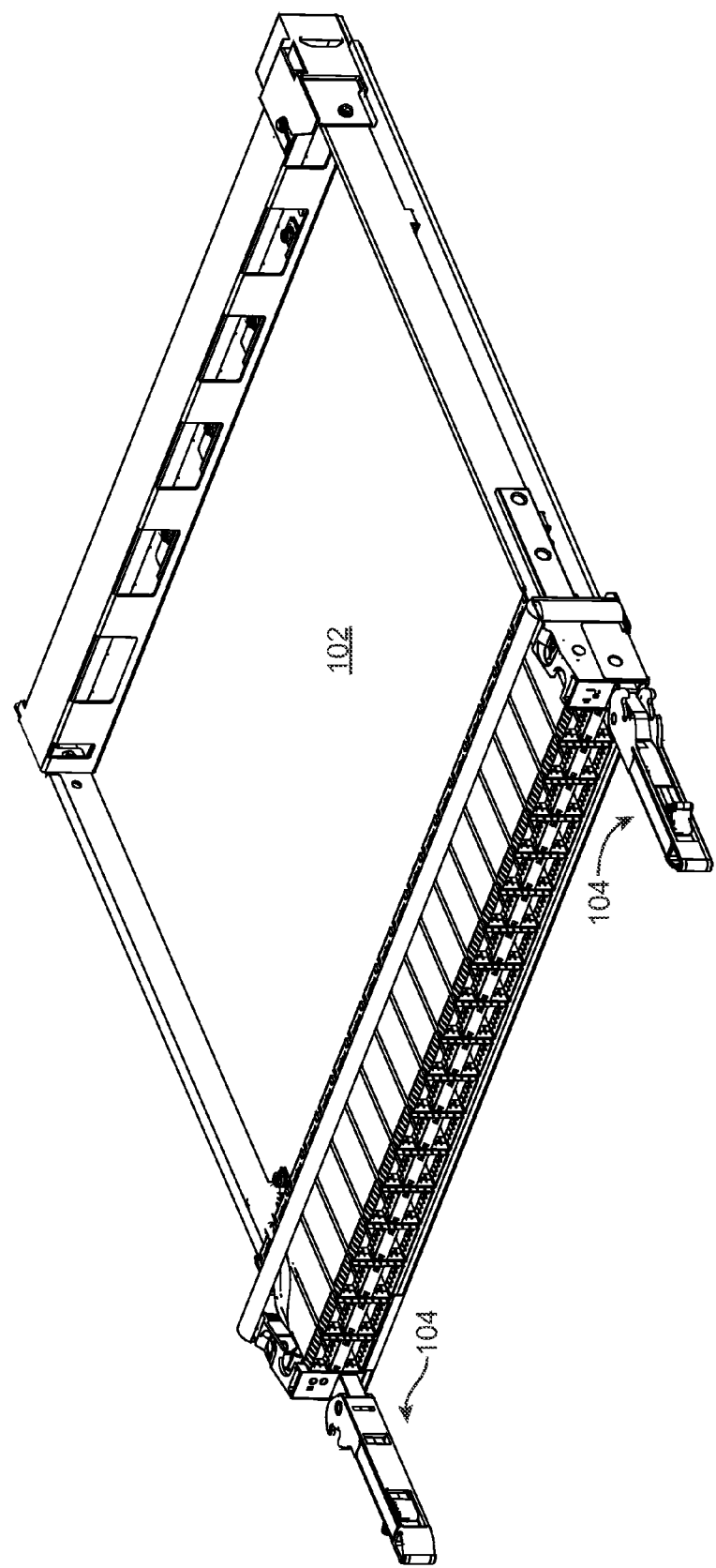

SINGLE-MOTION TRIGGER EJECTOR WITH OPTICAL SWITCH ACTUATOR

CROSS REFERENCE TO RELATED APPLICATIONS

This application claims priority to U.S. provisional application No. 61/900,991, filed on Nov. 6, 2013, which is expressly incorporated by reference herein in its entirety.

TECHNICAL FIELD

The present technology pertains to line card insertion and removal tools, and more specifically pertains to line card insertion and removal tools that are integrated with the line card for introduction/removal of line cards from a network device chassis.

BACKGROUND

As networked equipment has become increasingly critical to business and everyday tasks, and the requirements for network bandwidth continue to expand, racks that house telecommunications equipment become more and more crowded. Network device chassis now fit a greater number of line cards, and each line card includes a greater number of ports; this has eliminated or at least significantly reduced available area on the faceplate of such line cards to engage the line card during installation into, or removal from, a network device chassis.

To compensate for this problem, tools for installing and removing line cards have been developed. Many such tools are built into the line card. In order to minimize the area these tools take up on the line card faceplate, some such tools include line card ejectors that place ejector handles between the faceplate of the line card and the faceplate of the adjacent card. However, these designs limit the number of line cards that can fit within a chassis, and still require one or more other tools to either discontinue network communications, or to unsecure (unscrew) the line card from the chassis. Accordingly, a better line card ejector/injector is needed.

BRIEF DESCRIPTION OF THE DRAWINGS

In order to describe the manner in which the aforementioned features and other advantages of the disclosure can be obtained, a more specific description of the principles briefly described above will be rendered by reference to specific embodiments thereof which are illustrated in the appended drawings. Understanding that these drawings depict only exemplary embodiments of the disclosure and therefore are not to be considered limiting of its scope, the principles herein are described and explained with additional specificity and detail through the use of the accompanying drawings in which:

FIG. 10 illustrates an example line card having line card insertion/removal tools on each side of the line card.

DESCRIPTION OF EXAMPLE EMBODIMENTS

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

The disclosed technology addresses the need in the art for a line card insertion and removal tool that takes up little space on the faceplate of the line card and is easier to use. Technicians often need to get fingers into tight spaces to turn thumbscrews and grab ejector handles to disengage a line card from a chassis in the datacenter. The present technology provides a line card insertion/removal tool to mate and unmate a line card into a network device chassis that provides easy access and only single-hand and finger motion to operate the line card insertion/removal tool. Operation of the line card insertion/removal tool also opens and closes and optical switch, notifying the system that the line card is being added to, or removed from, the system.

The single-motion trigger line card insertion/removal tool uses a combination metal handle and a spring-loaded, sliding plastic "trigger" to allow the technician to grab the line card insertion/removal tool with their thumb and pointer fingers and pull the trigger while rotating the handle to eject the line card from the system. The motion of pulling the trigger simultaneously unlocks the line card insertion/removal tool, starts the rotation of the handle with the spring load, and closes a "window" on an optical switch, breaking a continuous beam of light; the software interprets this as a warning that the line card will be removed momentarily. When the line card insertion/removal tool handle is rotated back to a closed position (i.e. while inserting the card), the spring tension pulls the trigger back to its original position, locking the line card insertion/removal tool handle, and opening the window for the beam of light in the optical switch. The plastic trigger slides inside the line card insertion/removal tool handle and is attached to an extension spring inside the line card insertion/removal tool bracket that mounts to the line card. The optical switch is assembled to the surface of the line card and the line card insertion/removal tool assembly is assembled over the top of the switch so that the line card insertion/removal tool assembly is entirely mechanical without any electric components.

DESCRIPTION

Figure 1:
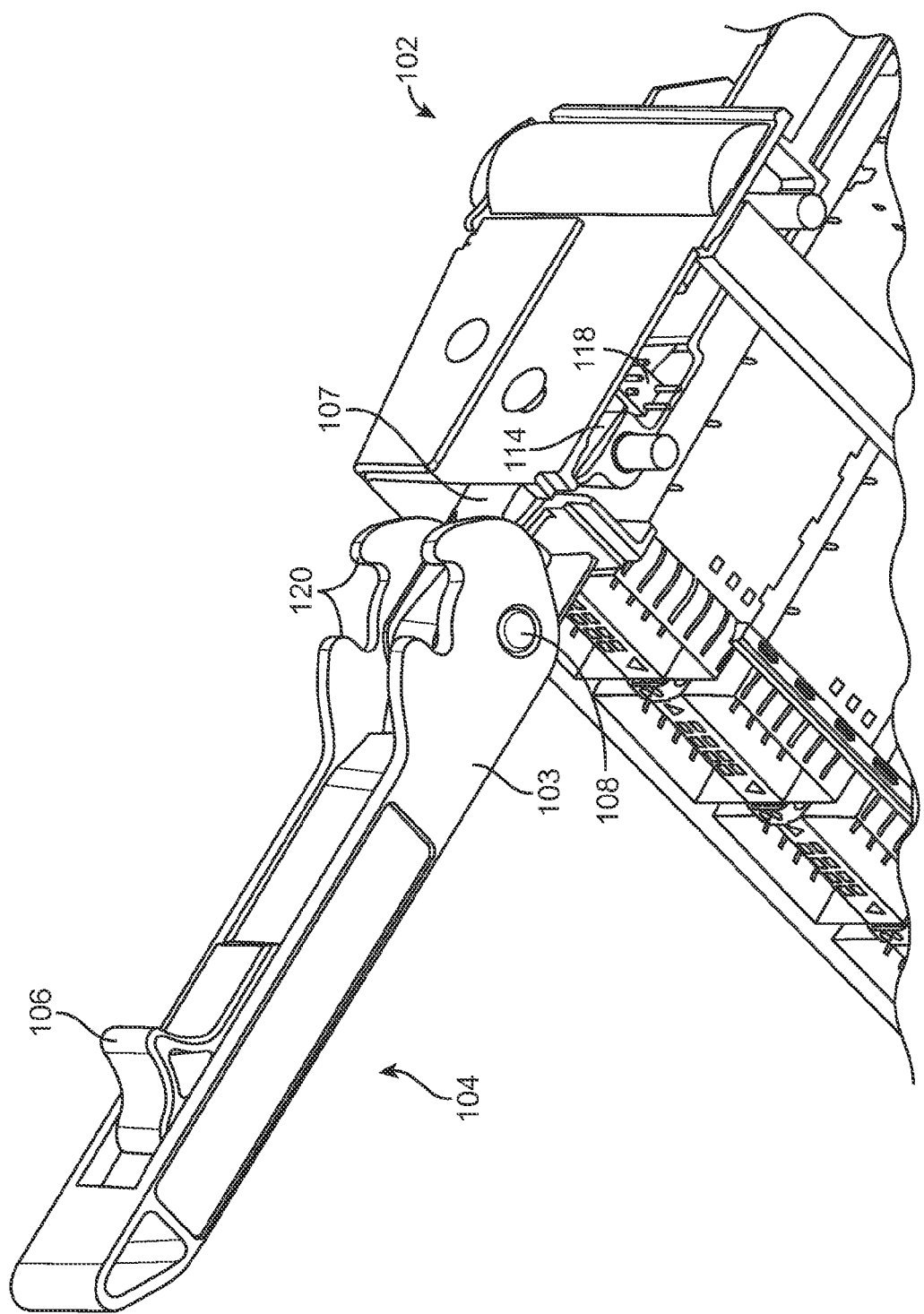
FIG. 1 illustrates an example bottom view of a line card with an example line card insertion/removal tool.

FIG. 1 illustrates a bottom view of a line card with an example line card insertion/removal tool. In some embodiments the insertion/removal tool is integrated with the line card.

As illustrated in FIG. 1, line card 102 is integrated with line card insertion removal tool 104. Line card insertion removal tool 104 is comprised of a handle 103, a trigger 106, a pivot 108, flag 114, and rail engagement surfaces 120.

Figure 2:
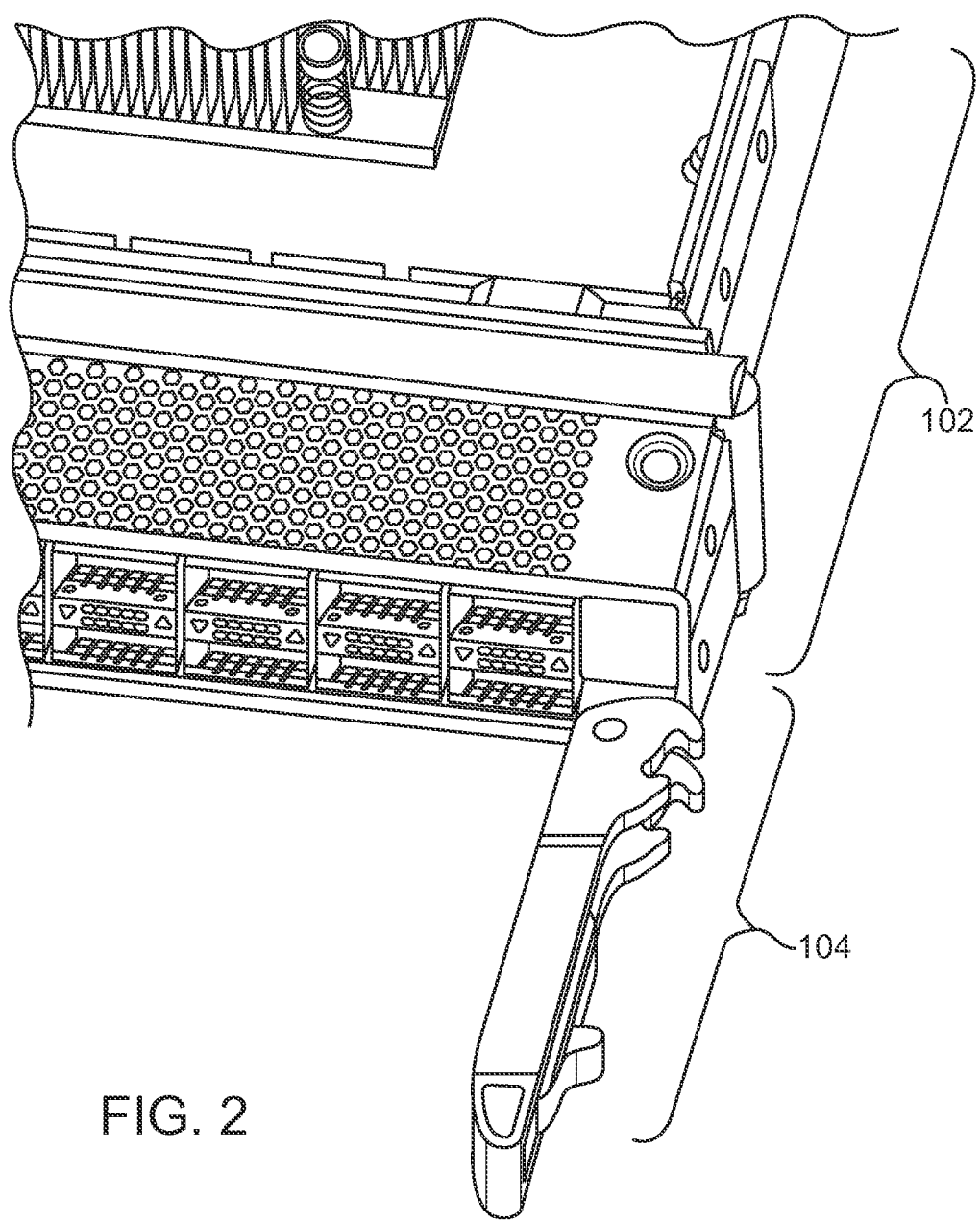
FIG. 2 illustrates an example top view of the line card with integrated line card insertion tool.

FIG. 2 illustrates an example top view of the line card 102 with integrated line card insertion tool 104.

Figure 3:
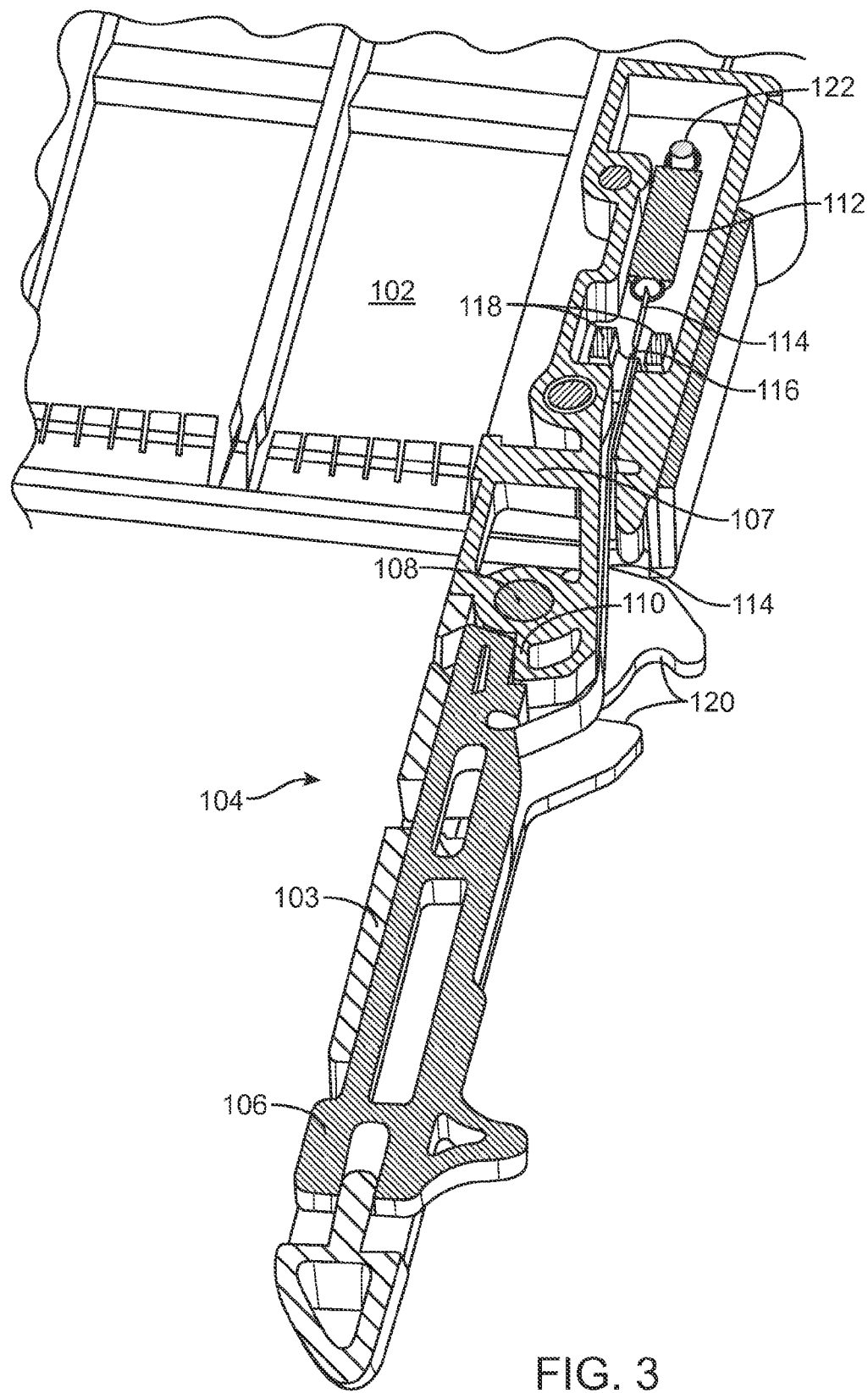
FIG. 3 illustrates an example cross section view of the line card and integrated insertion tool of FIG. 2 showing some internal component parts of the line card and the line card insertion removal tool.

FIG. 3 illustrates an example cross-section view of the line card and integrated insertion tool of FIG. 2, showing some internal component parts of the line card and the line card insertion removal tool.

As illustrated in FIG. 3, the line card insertion tool 104 is integrated or attached to the line card 102 by way of bracket 107. Additionally, the line card insertion tool 104 is further secured to the line card by way of flag 114, which is secured to spring 112, which is itself mounted to the line card 102 by way of spring mount 122.

The line card insertion tool 104 is configured to assist a technician in inserting or removing a line card quickly and efficiently, and preferably with a one handed operation. The line card insertion tool 104 includes a handle 103 to be engaged by the single hand of an operator. Within the handle 103, and protruding out the bottom of the handle, is the trigger 106. The trigger 106 is seated within the handle 103 in a configuration that permits retracting the trigger away from the line card 102. The trigger is connected to a flag 114 at a location near the pivot 108. In some embodiments the trigger can be connected to the flag at a handle attachment point located at any point along the body of the trigger that would allow the flag to move with the trigger when it is retracted.

The flag is itself connected at the spring attachment point (end opposite from the trigger) to spring 112. Spring 112, through tension that is applied and transferred through the flag, biases the trigger 106 into the non-retracted position. When the trigger 106 is retracted by an operator, the flag is dragged along with the trigger and transmits the force to the spring 112, which is stretched between the retracted flag at the spring's one end and a stationary spring anchor 122 at its other end. When an operator no longer provides enough force to overcome the spring's tension, the trigger returns to its non-retracted position.

When the trigger is in the non-retracted position, as illustrated in FIG. 3, the distal end of the trigger engages with a pivot lock surface 110. When the distal end of the trigger 106 engages with the pivot lock surface 110, an operator is not able to pivot the handle 103 about the pivot 108.

In addition to connecting the trigger 106 to the spring 112, the flag 114 functions to trip an optical sensor 118 mounted on the line card 102. The flag can be made of a thin flexible metal or flexible plastic material that is also rigid enough to retract the spring 112 when the trigger 106 is retracted, and to bias the trigger 106 into the non-retracted position when an operator's force does not overcome the tension of the spring 112. In some embodiments, the flag can be wide and thin, much like the tape in a measuring tape device.

As noted above, the flag functions to trip the optical sensor 118. The optical sensor 118 comprises a first terminal and a second terminal wherein the first terminal transmits light (e.g., a beam of light) and the second terminal receives the light. A channel is formed between the two terminals of the optical sensor 118.

Figure 4:
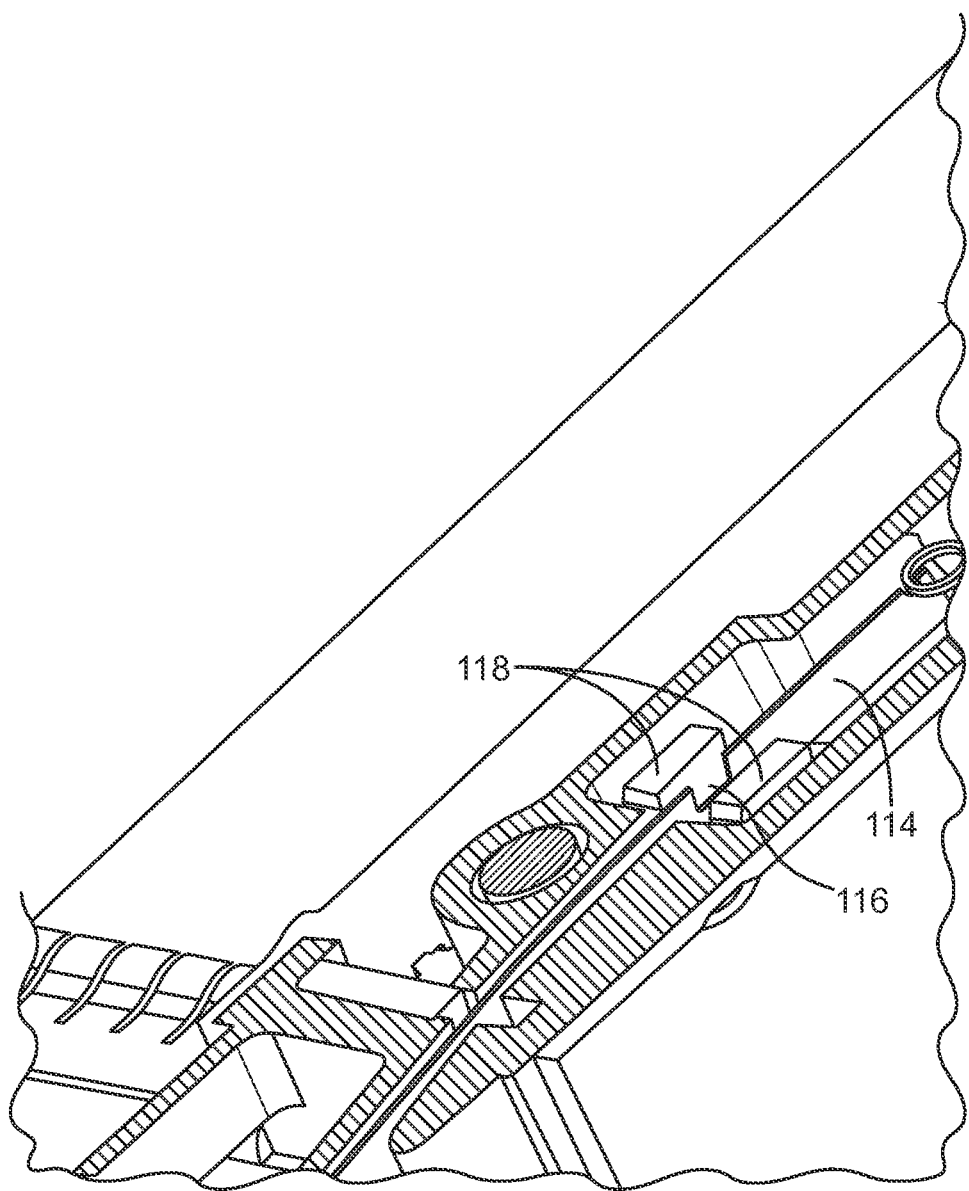
FIG. 4 illustrates an example close up perspective view of an optical sensor and the orientation of a flag when a trigger remains in a non-retracted position.

FIG. 4 illustrates a close up perspective view of the optical sensor and the orientation of the flag when the trigger remains in a non-retracted position. As illustrated in FIG. 4, two terminals of the optical sensor 118 form a channel and the flag 114 is disposed within this channel. The flag 114 further includes a window 116 configured to allow light to pass relatively unobstructed from one terminal of the optical sensor 118 to the other terminal of the optical sensor 118.

Figure 5:
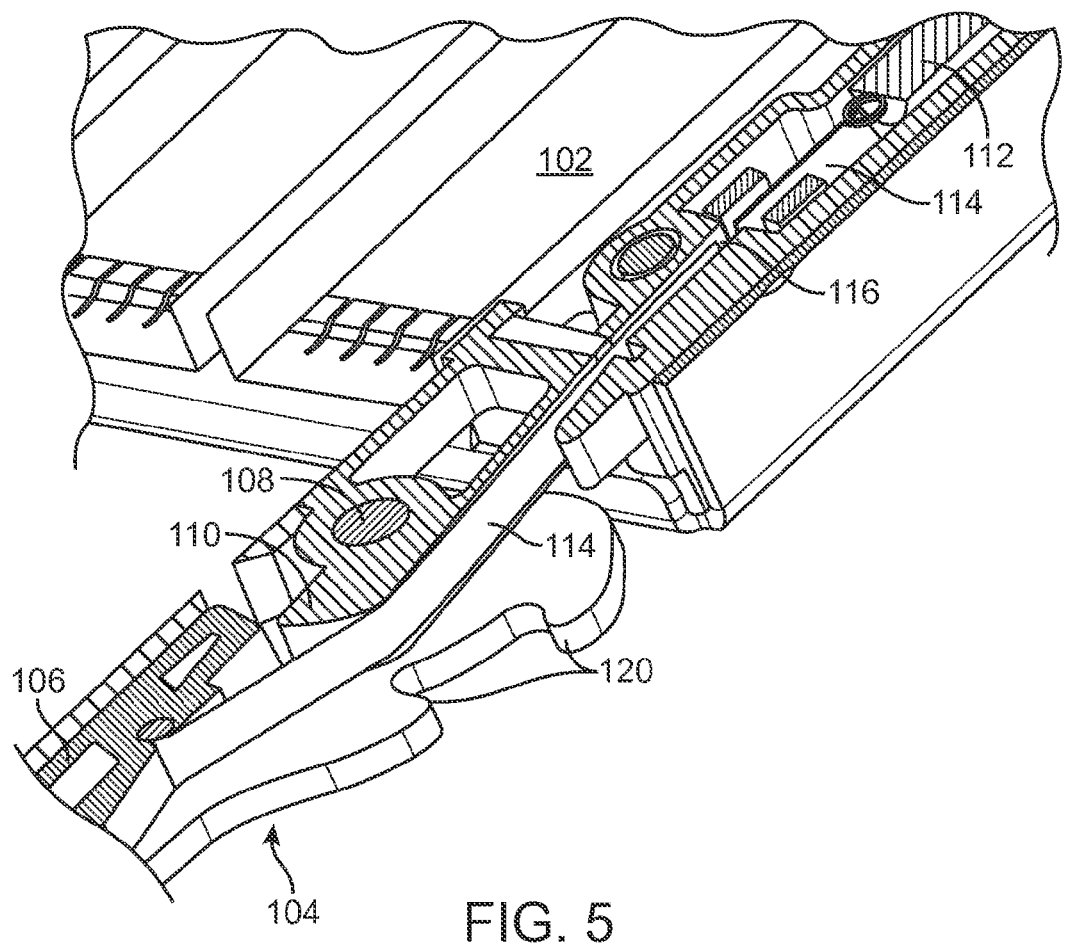
FIG. 5 illustrates substantially the same view as FIG. 3 except that the trigger is withdrawn and the flag window is located outside of the channel between the terminals of the optical sensor.
Figure 6:
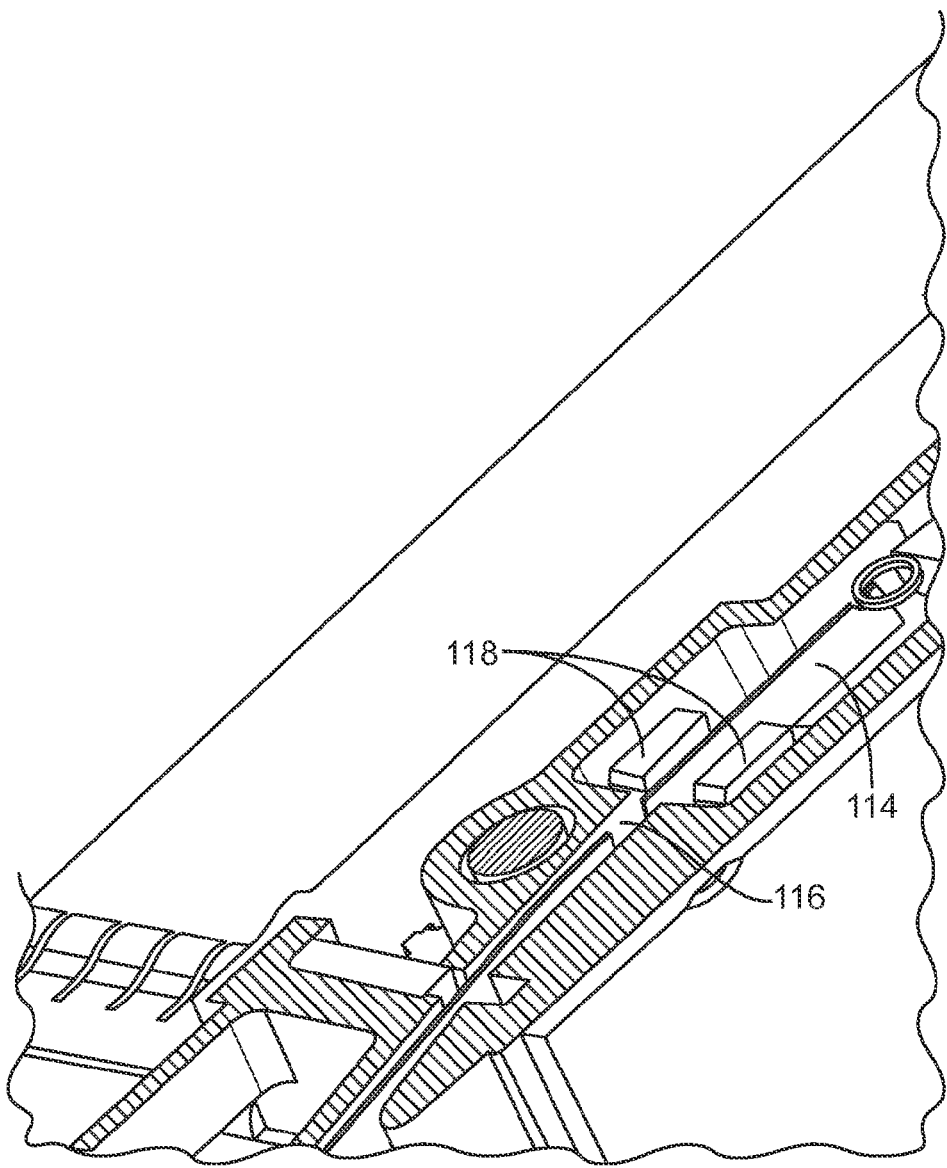
FIG. 6 illustrates substantially the same view as FIG. 4 except that the flag window is located outside of the channel between the terminals of the optical sensor.
Figure 9:
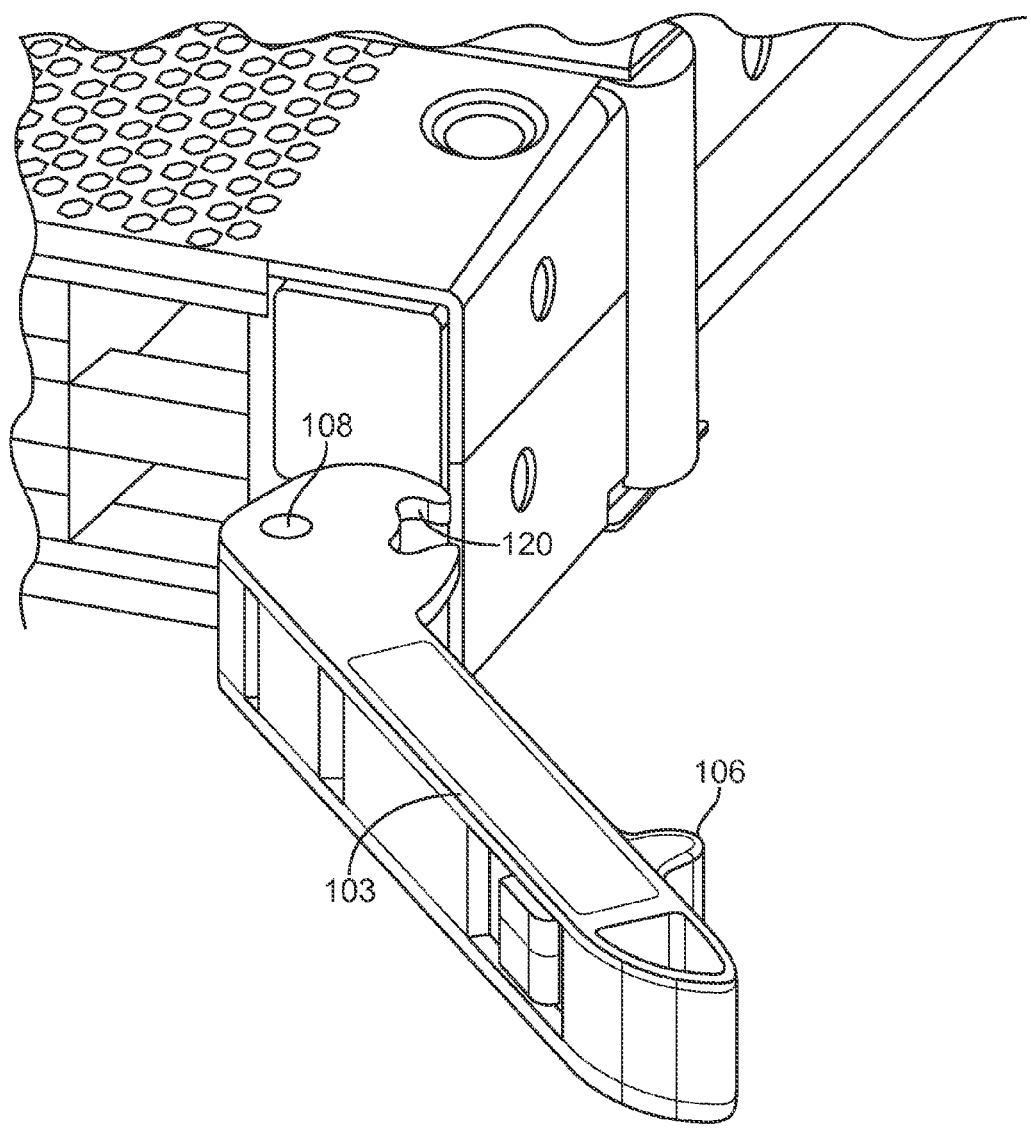
FIG. 9 illustrates an example view of the line card insertion/removal tool in a configuration in which the trigger is withdrawn, the handle is rotated.

The optical sensor 118 is configured to send an electrical signal to the line card 102, which is relayed to the network device the line card 102 is installed in, or being installed in, to inform the line card 102 and network device that the line card 102 is about to be removed or has been installed. When the line card 102 is installed, the trigger is returned to its retracted position as illustrated in FIG. 3 and FIG. 4; the flag window 116 sits between the sensors of the optical sensor and light is allowed to pass relatively unobstructed from one terminal of the optical sensor 118 to the other terminal of the optical sensor 118. However, when the trigger 106 is refracted as illustrated in FIG. 5, FIG. 6, and FIG. 9, the flag window 116 is displaced and the flag body 114 sits in the channel between the optical sensors and obstructs light from one terminal from reaching the second terminal. When this occurs, the optical sensor can notify the line card that it is about to be removed and that no more data should be handled by the line card 102.

FIG. 5 illustrates substantially the same view as FIG. 3, except that the trigger is withdrawn and the flag window is located outside of the channel between the terminals of the optical sensor.

Likewise FIG. 6 illustrates substantially the same view as FIG. 4, except that the flag window is located outside of the channel between the terminals of the optical sensor.

In addition to being configured to notify the line card 102 that it has been installed or that it is about to be uninstalled, the insertion/removal tool 104 is further configured to aid in the physical insertion and removal of the line card 102.

The insertion/removal tool 104 includes rail engagement surfaces 120. Rail engagement surfaces are configured to engage a rail on the chassis of the network device an provide leverage onto the rail to move the line card into the chassis and lock it in place, or to move the line card out of the chassis.

Figure 8:
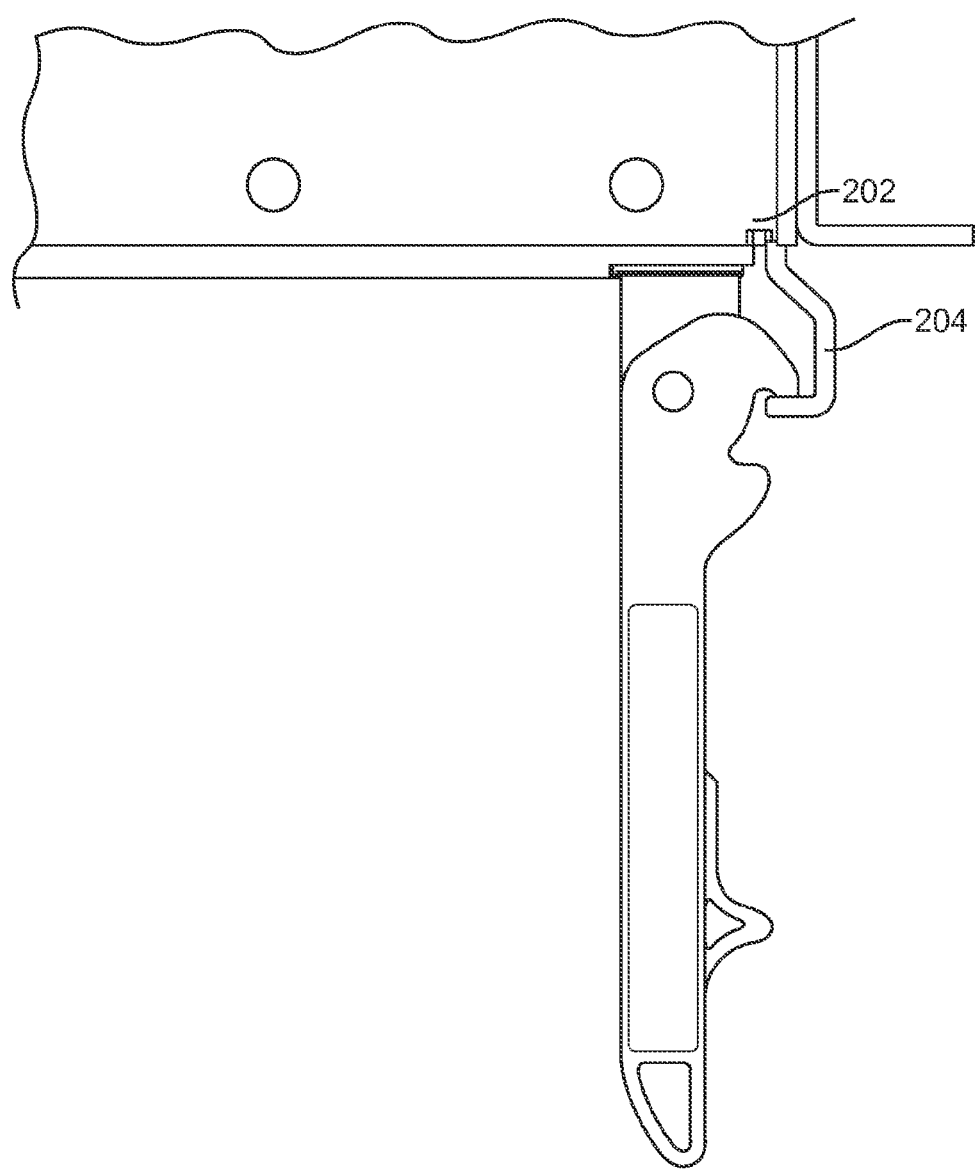
FIG. 8 illustrates an example line card insertion/removal tool with the line card inserted into a network device chassis.

FIG. 8 illustrates the line card insertion/removal tool 104 of the present technology, with the line card 102 inserted into the network device chassis 202 and the line card insertion removal tool 104 engaging a rail 204, and with the rail engagement surface 120 for engaging the rail 204 of the network device chassis 202. In the illustrated configuration, the line card insertion/removal tool 104 is in a locked orientation with the trigger in its non-retracted configuration and engaging the pivot lock 110. The rail engagement surface 120 engages the rail in such a way that leverage is provided from the rail engagement surface to lock the line card 102 in place in the chassis 202, thus eliminating the need for conventional screws to anchor the line card 102 in place.

When used to remove the line card 102 from chassis 202, the trigger 106 can be engaged by a technician's finger and withdrawn. As noted above, when the trigger is withdrawn, the flag window 116 is displaced and the flag blocks optical transmission from one terminal of the optical sensor 116 to the other terminal, thereby triggering the optical sensor to send an electronic signal to the line card indicating that it is about to be removed.

Now that the line card insertion/removal tool 104 is in an unlocked state (trigger 106 is withdrawn and does not engage the pivot lock 110), the technician can remote the tool 104 by exerting a force on handle 103 to induce rotation of the handle 103 portion of the tool 104. This rotation brings the rail engagement surface 120 into contact with the outside portion of the rail 204, while moving the opposing face of the rail engagement surface 120 away from the inside portion of the rail 204. Continued rotation of the handle 103 portion of the tool results in a leveraged force being exerted by the rail engagement surface 120 onto the rail 204 that is translated into an opposite force sufficient to begin to dislodge the line card from the network device chassis.

Figure 7:
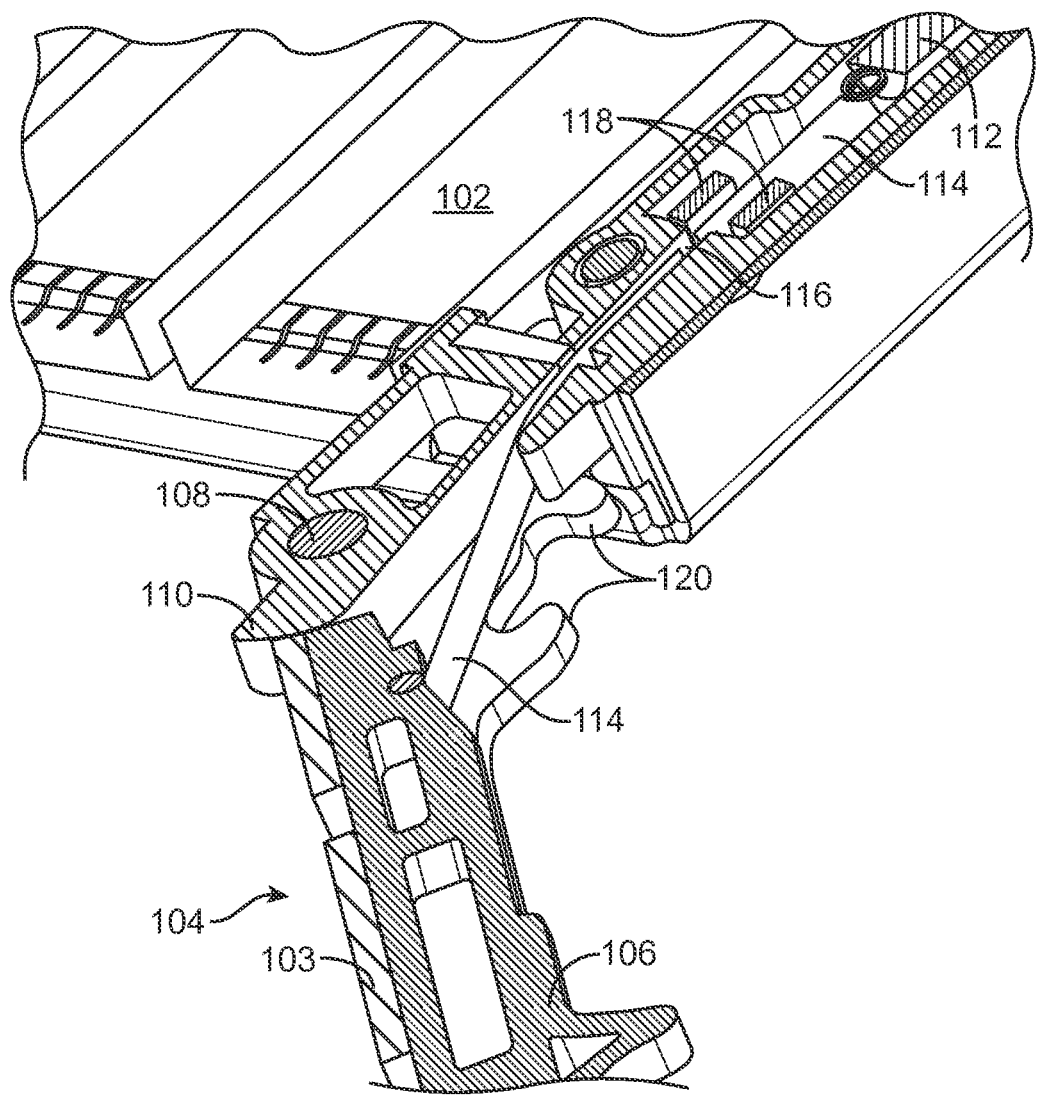
FIG. 7 illustrates an example line card insertion/removal tool in a configuration in which the handle rotated.

FIG. 7 illustrates the line card insertion/removal tool 104 in a configuration in which the trigger 106 is withdrawn, the handle 103 is rotated, and the flag window 116 is not within the channel between the terminals of optical sensor 118.

FIG. 9 illustrates a further view of the line card insertion/removal tool 104 in a configuration in which the trigger 106 is withdrawn and the handle 103 is rotated. While not shown, in this configuration the rail engagement surface is configured to engage the rail 204 and provide resulting forces sufficient to begin to dislodge the line card 102 from the network device chassis.

The line card insertion/removal tool 104 can be used to aid in inserting a line card 102 into a network device chassis 202 in the opposite manner in which it was used to remove the line card. With the handle 103 rotated (and thus the trigger withdrawn and not engaging the pivot lock 110), the line card can be inserted into the network device chassis 202 until the rail engagement surface 120 begins to engage the rail 204. The operator can rotate the handle 103 portion of the line card insertion/removal tool 104 in the opposite direction used to remove the line card from the network device chassis, which causes the opposite surface of the rail engagement surfaces 120 to engage the back portion of rail 204. As the handle 103 is rotated further towards its lock position, the line card is urged further and more securely into the network chassis until the trigger (which is biased by spring 112 into the non-retracted position) engages the pivot lock 110 in its not retracted position. At which point, a combination of the line card insertion/removal tool 104 being locked from pivoting and the rail engagement surface being engaged with rail 204 secures the line card in the network device chassis 202. At the same time, flag window 116 is now located in the middle of the channel formed by the terminals of the optical sensor 118. As the line card draws power from the network device, the optical sensor activates, and sends a signal to the line card 102 that it is securely installed and is ready begin accepting data.

FIG. 10 illustrates an example line card having line card insertion/removal tools on each side of the line card. Line card 102 is shown having a line card insertion/removal tools 104 on the left most portion and the right most portion. The line card insertion/removal tools 104 function as mirror images of each other in the same manner as described herein. Together they function to secure each side of the line card to the chassis, or to facilitate removal of each side the line card. In some embodiments, the line card might only have one optical sensor and a line card insertion/removal tool on the side of the line card that does not have the optical sensor need not have a flag window.

Although a variety of examples and other information were used to explain aspects within the scope of the appended claims, no limitation of the claims should be implied based on particular features or arrangements in such examples, as one of ordinary skill would be able to use these examples to derive a wide variety of implementations. Furthermore, although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A line card ejector comprising:
    a handle;
    a trigger enclosed within the handle;
    a flag attached the handle at a handle attachment point and attached to a spring at a spring attachment point, the flag including a window defined within the flag between handle attachment point and the spring attachment point.

2. The line card ejector of claim 1, whereby the window allows a light from an optical sensor to pass through the flag.

3. The line card ejector of claim 1, further comprising:
    a line card including the spring fixed thereto.

4. The line card ejector of claim 3, further comprising:
    an optical sensor having a first terminal and a second terminal, the optical sensor fixed to the line card, the flag positioned such that the flag passes between the first terminal and the second terminal of the optical sensor.

5. The line card ejector of claim 4, further comprising:
    a pivot enclosed within the handle, the handle configured to rotate about the pivot.

6. The line card ejector of claim 5, wherein the opening defined within the flag is positioned between the first terminal and the second terminal of the optical sensor, whereby light passes from the first terminal through the window defined within the flag and is received by the second terminal of the optical sensor.

7. The line card ejector of claim 6 wherein the window defined within the flag is configured to be offset when the trigger is in a withdrawn position, whereby light does not pass from the first terminal to the second terminal of the optical sensor.

8. The line card ejector of claim of claim 7, wherein the optical sensor is configured to signal to the line card to discontinue transmitting data.

9. The line card ejector of claim of claim 7, further comprising:
    a rotation lock surface formed proximate to the pivot, wherein the trigger is configured to engage with the rotation lock when the trigger is not in a withdrawn position, whereby the handle is prevented from rotating about the pivot when the trigger is engaged with the rotation lock.

10. The line card ejector of claim 9, further comprising:
    a rail engagement surface configured to engage a rail of a network device chassis.

11. The line card ejector of claim 2, wherein the flag is made of a bendable material.

12. The line card ejector of claim 10, wherein the flag is made of a flexible metal.

13. A method of ejecting a line card using a line card ejector comprising:
    withdrawing a trigger—wherein the trigger becomes disengaged with a rotation lock proximate to a pivot and wherein a flag attached to the trigger and having a window defined therein and disposed within a channel between two terminal of an optical sensor—is offset such that the window moves out from the channel and the flag blocks transmission of light between the terminals.

14. The method of claim 13, further comprising:
rotating a handle that encloses the trigger about the pivot, whereby the flag is bends to accommodate the rotation, and whereby a rail engagement surface engages with rails on a chassis of a network device in which the line card is installed and facilitates the ejection of the line card from the network device.

\* \* \* \* \*